(12) United States Patent
Karuppoor et al.

(10) Patent No.: US 11,913,301 B2
(45) Date of Patent: Feb. 27, 2024

(54) INTEGRAL BELLOWS FOR OILFIELD EQUIPMENT

(71) Applicant: Schlumberger Technology Corporation, Sugar Land, TX (US)

(72) Inventors: Srinand Karuppoor, Sugar Land, TX (US); Abbigail Ullrich, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 71 days.

(21) Appl. No.: 17/658,481

(22) Filed: Apr. 8, 2022

(65) Prior Publication Data
US 2022/0325597 A1 Oct. 13, 2022

Related U.S. Application Data
(60) Provisional application No. 63/201,028, filed on Apr. 9, 2021.

(51) Int. Cl.
| | | |
|---|---|---|
| *F16J 15/52* | (2006.01) | |
| *F16J 3/04* | (2006.01) | |
| *E21B 33/10* | (2006.01) | |
| *E21B 17/02* | (2006.01) | |

(52) U.S. Cl.
CPC ............ *E21B 33/10* (2013.01); *E21B 17/02* (2013.01); *F16J 3/047* (2013.01); *F16J 15/52* (2013.01)

(58) Field of Classification Search
CPC ...................................................... F16J 3/047
See application file for complete search history.

(56) References Cited

U.S. PATENT DOCUMENTS

| | | | | |
|---|---|---|---|---|
| 1,095,100 | A * | 4/1914 | Fulton | F16J 3/047 138/121 |
| 7,871,250 | B2 * | 1/2011 | Yajima | F04B 43/107 277/389 |
| 11,209,089 | B2 * | 12/2021 | Bergström | F16J 15/36 |
| 2009/0133880 | A1 * | 5/2009 | Mandrou | F16L 55/05 166/212 |
| 2011/0236205 | A1 * | 9/2011 | Hombo | F01D 25/246 415/230 |

(Continued)

FOREIGN PATENT DOCUMENTS

| | | | | |
|---|---|---|---|---|
| DE | 102015206251 | A1 * | 10/2016 | F16J 3/047 |
| GB | 2124716 | A * | 2/1984 | F16J 3/047 |
| JP | 61031767 | A * | 2/1986 | F16J 3/047 |

OTHER PUBLICATIONS

DE102015206251A1_t machine translation thereof (Year: 2016).*

(Continued)

*Primary Examiner* — Abiy Teka
*Assistant Examiner* — Matthew Wiblin
(74) *Attorney, Agent, or Firm* — Jeffrey D. Frantz (57) ABSTRACT

A bellows assembly for a downhole tool includes a first seal ring, a second seal ring, and a bellows positioned at least partially between the first and second seal rings. The first seal ring, the second seal ring, and the bellows are integral with one another such that the bellows assembly is monolithic. The bellows is configured to expand and retract. The bellows is annular and has a diameter that varies over a length of the bellows. A material composition of the bellows varies over the length of the bellows.

18 Claims, 12 Drawing Sheets

(56) References Cited

U.S. PATENT DOCUMENTS

2015/0337968 A1* 11/2015 Strand .................. B23P 15/001
                                                            251/315.01
2018/0133803 A1    5/2018 Karuppoor
2019/0024794 A1*  1/2019 Fages ..................... F16J 15/022
2020/0109795 A1*  4/2020 Murray ................ F16K 15/021

OTHER PUBLICATIONS

JP61031767A_t machine translation thereof (Year: 1986).*
S. Shao et al., (2019) Overview: Additive Manufacturing Enabled Accelerated Design of Ni-based Alloys for Improved Fatigue Life, Additive Manufacturing 29 (13 Pages).
A. Costas et al, ASME 2019, Production and Characterization of a Fully 3d Printed Flexible Bellows Actuator, Conference on Smart Materials, Sep. 9-11, 2019, Louisville, KY, USA (8 pages).
Y. Yamashita et al, (2018) Defect analysis and fatigue design basis for Ni-based superalloy 718 manufactured by selective laser melting, International Journal of Fatigue 117, 485-495.

* cited by examiner

INTEGRAL BELLOWS FOR OILFIELD EQUIPMENT

CROSS-REFERENCE TO RELATED APPLICATION

This application claims priority to and the benefit of U.S. Provisional Application No. 63/201,028, entitled "Integral Bellows for Oilfield Equipment" and filed Apr. 9, 2021, which is incorporated by reference herein in its entirety for all purposes.

BACKGROUND

In oilfield applications, a bellows is an annular device that is configured to be connected between two tubular members. For example, the bellows may be configured to separate two fluids; one fluid may be radially inside of the bellows (e.g., in a bore of the bellows), and another fluid may be radially outside of the bellows. The bellows may be configured to extend and retract (e.g., in response to temperature and/or pressure variations in the fluid(s)), while maintaining separation of the fluids.

There are many different applications for bellows and different sizes and types may be called for to suit the various operating conditions and environments of such applications. One application is a pressure compensator or mechanism actuation for downhole tools. For these applications, conventional bellows are made of corrosion-resistant alloys via conventional tool and die forming of a tube. Annular rings are fastened to each end of the bellows (e.g., via welding), which facilitates assembly and provides a gas-tight joint. Over time and use, fatigue in the joints begins to create stress fractures in the joints, leading to leakage.

SUMMARY

A bellows assembly for a downhole tool is disclosed. The bellows assembly includes a first seal ring, a second seal ring, and a bellows positioned at least partially between the first and second seal rings. The first seal ring, the second seal ring, and the bellows are integral with one another such that the bellows assembly is monolithic. The bellows is configured to expand and retract. The bellows is annular and has a diameter that varies over a length of the bellows. A material composition of the bellows varies over the length of the bellows.

A method for manufacturing a bellows assembly is also disclosed. The method includes determining a load that the bellows assembly is configured to experience. The method also includes determining a number of cycles that the bellows assembly is configured to experience. The method also includes determining a thickness of a bellows of the bellows assembly based at least partially upon the load and the number of cycles. The method also includes determining a material composition of the bellows based at least partially upon the load and the number of cycles. The material composition varies over a length of the bellows. The method also includes manufacturing the bellows assembly via an additive manufacturing process such that the bellows assembly is a monolithic component. The bellows assembly is manufactured based at least partially upon the thickness and the material composition. The bellows assembly includes a first seal ring, a second seal ring, and the bellows positioned therebetween.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
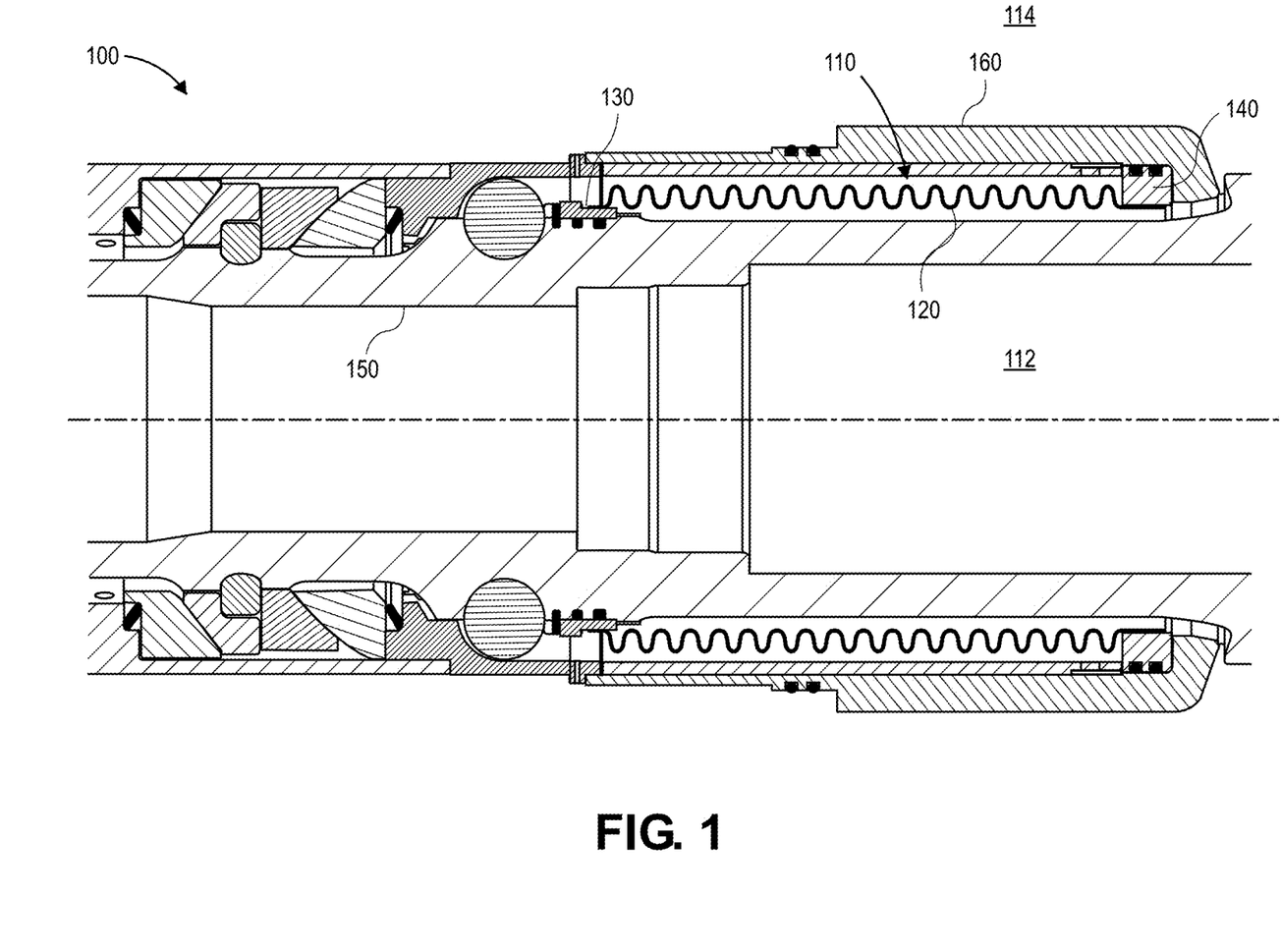
FIG. 1 illustrates a cross-sectional side view of a portion of a downhole tool including a bellows assembly, according to an embodiment.

FIG. 1 illustrates a cross-sectional side view of a portion of a downhole tool 100 including a bellows assembly 110, according to an embodiment. The bellows assembly 110 is configured to be used in oilfield applications (e.g., in a wellbore); however, it may also or instead be used in other applications outside of the oilfield. The bellows assembly 110 may be configured to separate a first fluid and a second fluid. More particularly, the bellows assembly 110 may be configured to prevent a first fluid that is positioned radially inside 112 of the bellows assembly 110 (e.g., in a bore 112 of the bellows assembly 110) from combining or mixing with a second fluid that is positioned radially outside 114 of the bellows assembly 110. The bellows assembly 110 may also be configured to isolate a hydraulic pressure of the first fluid from a hydraulic pressure of the second fluid. The bellows assembly 110 may be configured to expand and retract in an axial direction and/or a radial direction. The bellows assembly 110 may be configured to expand and retract in response to temperature variations and/or pressure variations in the first fluid, the second fluid, or both. The bellow assembly may be configured to expand and/or contract mechanically by moving the ends and have a pre-load.

As discussed in greater detail below, the bellows assembly 110 may be an integral, monolithic component with a varying thickness and/or material composition over the length of the bellows assembly 110. These features may allow a user to configure the bellows assembly 110 to have a predetermined deflection, spring rate, von mises stress, or a combination thereof in response to a predetermined load.

As shown, the bellows assembly 110 may be configured to be coupled to and/or positioned at least partially between a first (e.g., upper) tubular member 150 and a second (e.g., lower) tubular member 160. The bellows assembly 110 may be annular and have a bore 112 formed axially therethrough. The bellows assembly 110 may include a bellows 120, a first (e.g., upper) seal ring 130, and a second (e.g., lower) seal ring 140.

Figure 2:
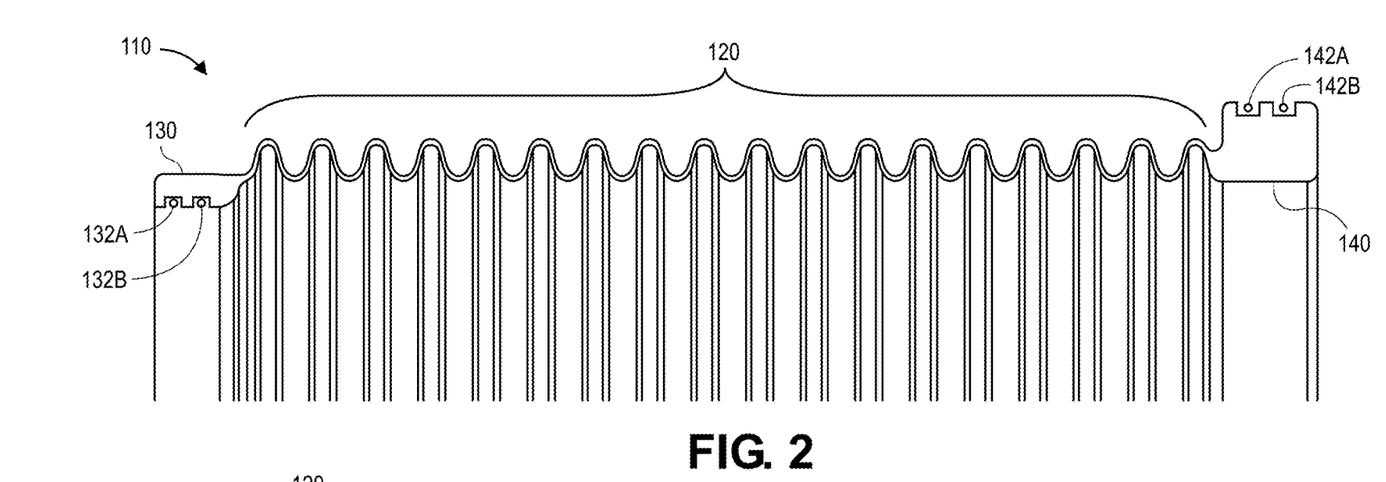
FIG. 2 illustrates a cross-sectional side view of a portion of the bellows assembly, according to an embodiment.
Figure 3:
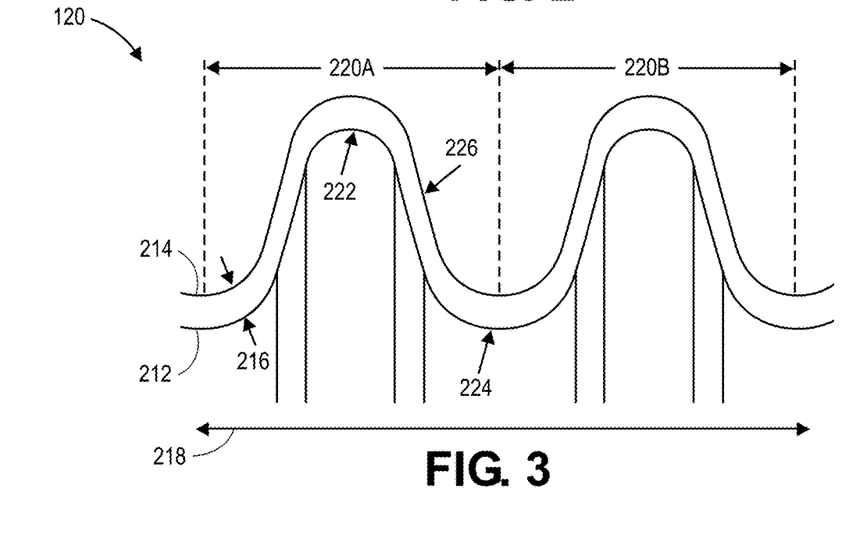
FIG. 3 illustrates an enlarged view of a portion of FIG. 2, according to an embodiment.

FIG. 2 illustrates a cross-sectional side view of a portion of the bellows assembly 110, and FIG. 3 illustrates an enlarged view of a portion of FIG. 2, according to an embodiment. Referring now to FIGS. 1-3, the first seal ring 130 may be configured to contact the first tubular member 150. In one embodiment, the first seal ring 130 may be configured to be coupled to the first tubular member 150. The first seal ring 130 may include one or more sealing members (two are shown: 132A, 132B) proximate to an inner surface thereof that are configured to contact and form a seal with an outer surface of the first tubular member 150. The sealing members 132A, 132B may be positioned at least partially within recesses in the inner surface. Similarly, the second seal ring 140 may be configured to contact the second tubular member 160. In one embodiment, the second seal ring 140 may be configured to be coupled to the second tubular member 160. The second seal ring 140 may include one or more sealing members (two are shown: 142A, 142B) proximate to an outer surface thereof that are configured to contact and form a seal with an inner surface of the second tubular member 160. The sealing members 142A, 142B may be positioned at least partially within recesses in the outer surface. The sealing members 132A, 132B, 142A, 142B may be or include elastomeric O-rings.

The bellows 120 may be positioned between the first and second seal rings 130, 140. The bellows 120 may be coupled to or integral with the first and second seal rings 130, 140. The bellows 120 may include an inner surface 212 and an outer surface 214. The bellows 120 (e.g., the inner surface 212 and/or the outer surface 214) may have a varying diameter. For example, the bellows 120 may have a wave-like shape (e.g., like a sinewave). Thus, each period 220A, 220B of the bellows 120 may include an outer radial portion 222 and an inner radial portion 224. The outer radial portion 222 and the inner radial portion 224 may be or include curved portions. Each adjacent pair of curved portions 222, 224 may be connected by an intermediate portion 226. The intermediate portion 226 may be substantially straight (or at least straighter than the curved portions 222, 224).

A thickness 216 of the bellows 120 (e.g., between the surfaces 212, 214) may be from about 0.178 mm to about 0.508 mm. In one embodiment, the thickness 216 of the bellows 120 may vary along a length 218 of the bellows 120. More particularly, the thickness 216 proximate to the curved portions 222, 224 may be different (e.g., greater) than the thickness 216 proximate to the intermediate portion 226. For example, the thickness 216 proximate to the curved portions 222, 224 may be from about 0.3 mm to about 0.508 mm, and the thickness 216 proximate to the intermediate portion 226 may be from about 0.178 mm to about 0.3 mm.

The bellows 120 may be made from metal. More particularly, the bellows 120 may be made from an elastic or super-elastic alloy that includes cobalt, nickel, iron, chromium, titanium, or a combination thereof. The alloy may also or instead be or include a shape-memory alloy. The alloy may be doped with one or more elements such as chromium, vanadium, copper, hafnium, palladium, platinum, zirconium, cobalt, or a combination thereof. The doping may create an elastic or super-elastic behavior under downhole conditions. In one embodiment, the materials (e.g., a material composition) of the bellows 120 may vary over the length 218 of the bellows 120. This may be achieved via an additive manufacturing process. Thus, a first portion of the bellows 120 may be made from a first material, and a second portion of the bellows 120 may be made from a second material that is different than the first material. In one embodiment, the first portion may be or include a first period 220A, and the second portion may be or include a second period 220B. In another embodiment, the first portion may be or include the curved portion(s) 222, 224, and the second portion may be or include the intermediate portion 226. For example, the first portion may be made from a shape-memory alloy, and the second portion may be made from regular metal alloy (i.e., a non-shape-memory alloy).

Having the thickness 216 and/or materials vary over the length 218 of the bellows 120 may allow a user to configure the compliance and/or stiffness of the bellows 120 so that the bellows 120 may expand and retract by the desired amount(s) in response to predetermined forces. The compliance and/or stiffness of the bellows 120 may be variable (e.g., non-linear) over the length 218 of the bellows 120 and/or proximate to the seal rings 130, 140. This may provide a predetermined energy absorption and release.

Some conventional bellows assemblies may be welded together. For example, some conventional bellows assemblies may have the bellows welded to the seal rings. In addition, some conventional bellows assemblies may have weld points on the curved portions (e.g., to join two adjacent periods together). The bellows assembly 110 described herein may not include any welding. The bellows assembly 110 may be an integral (e.g., monolithic) component. In an embodiment, the bellows assembly 110 may be formed by an additive manufacturing process. For example, the additive manufacturing process may be or include a powder bed fusion laser process where a laser may be used to thermally bond the components together. In another embodiment, the additive manufacturing process may be or include a powder bed fusion electron beam where an electron beam may be used to thermally bond the components together. In another embodiment, the additive manufacturing process may be or include a direct energy deposition process where a powder feed nozzle may be used to melt metal powder using a laser to form the bellows 120 and the seal rings 130, 140. In this embodiment, a multi-material combination may be possible. In another embodiment, the additive manufacturing process may be or include a binder-jet process where a binder may be used to fuse the layers and/or components together, and then the bellows assembly 110 may then be sintered in an oven. In yet another embodiment, the additive manufacturing process may be or include a material jetting process where a material is jetted via nozzles onto the layers and/or components, which are then fused by light (ultraviolet light, infrared light, etc.).

Figure 4A:
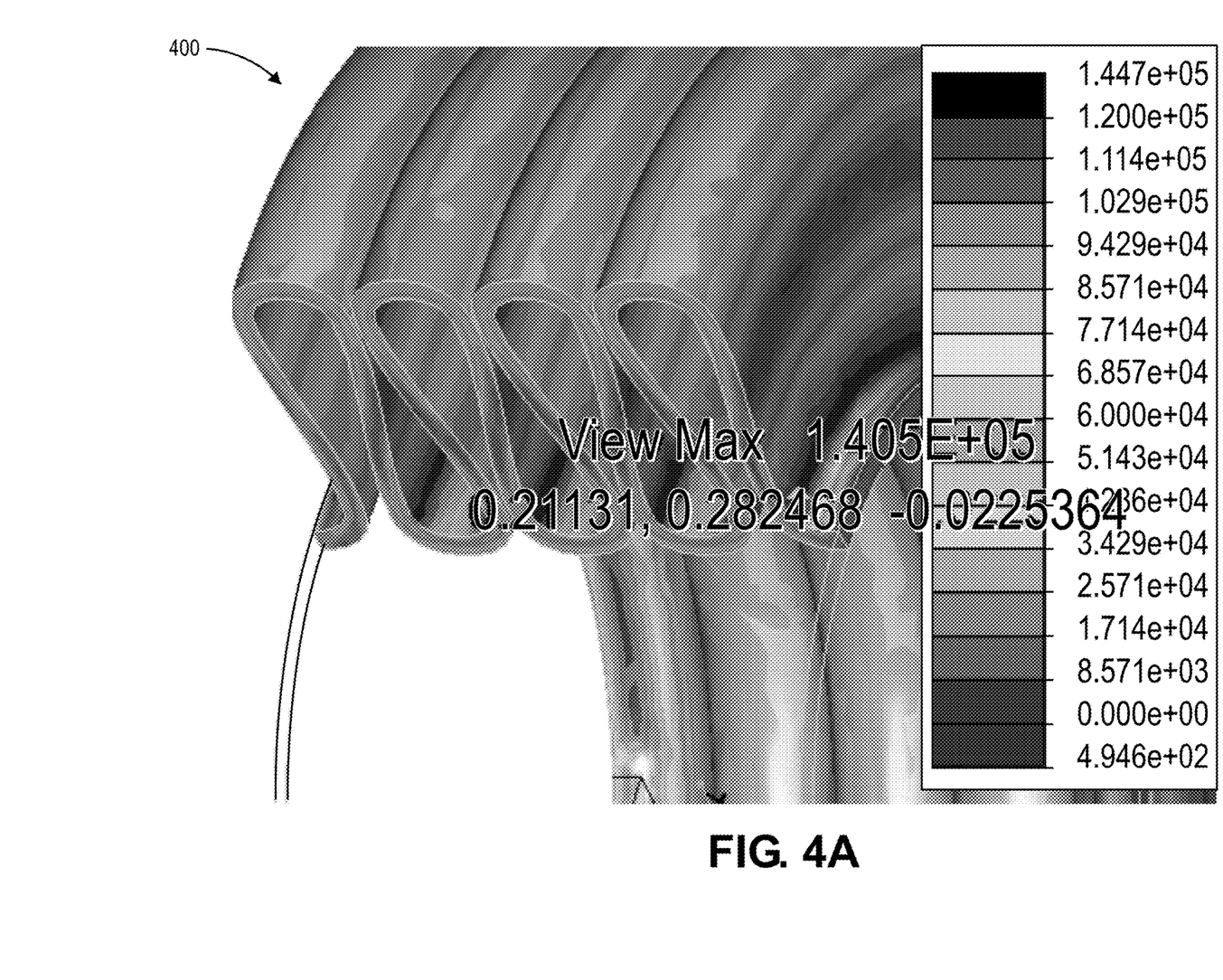
FIG. 4A illustrates a cross-sectional perspective view of a portion of a first design of another bellows.
Figure 4B:
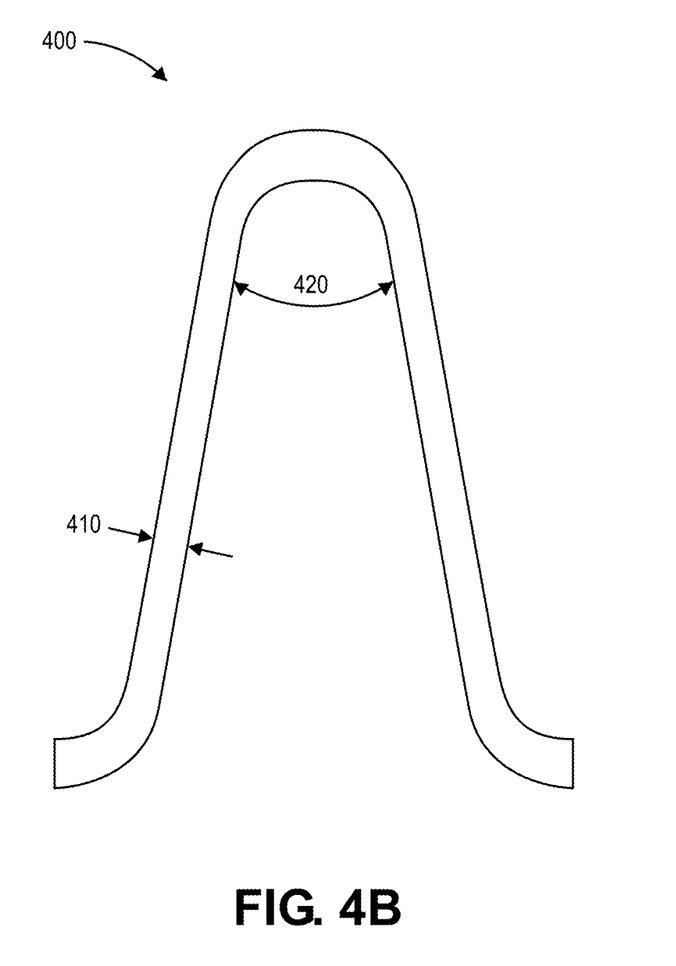
FIG. 4B is a cross-sectional side view of one period of the bellows in FIG. 4A, according to an embodiment.
Figure 5A:
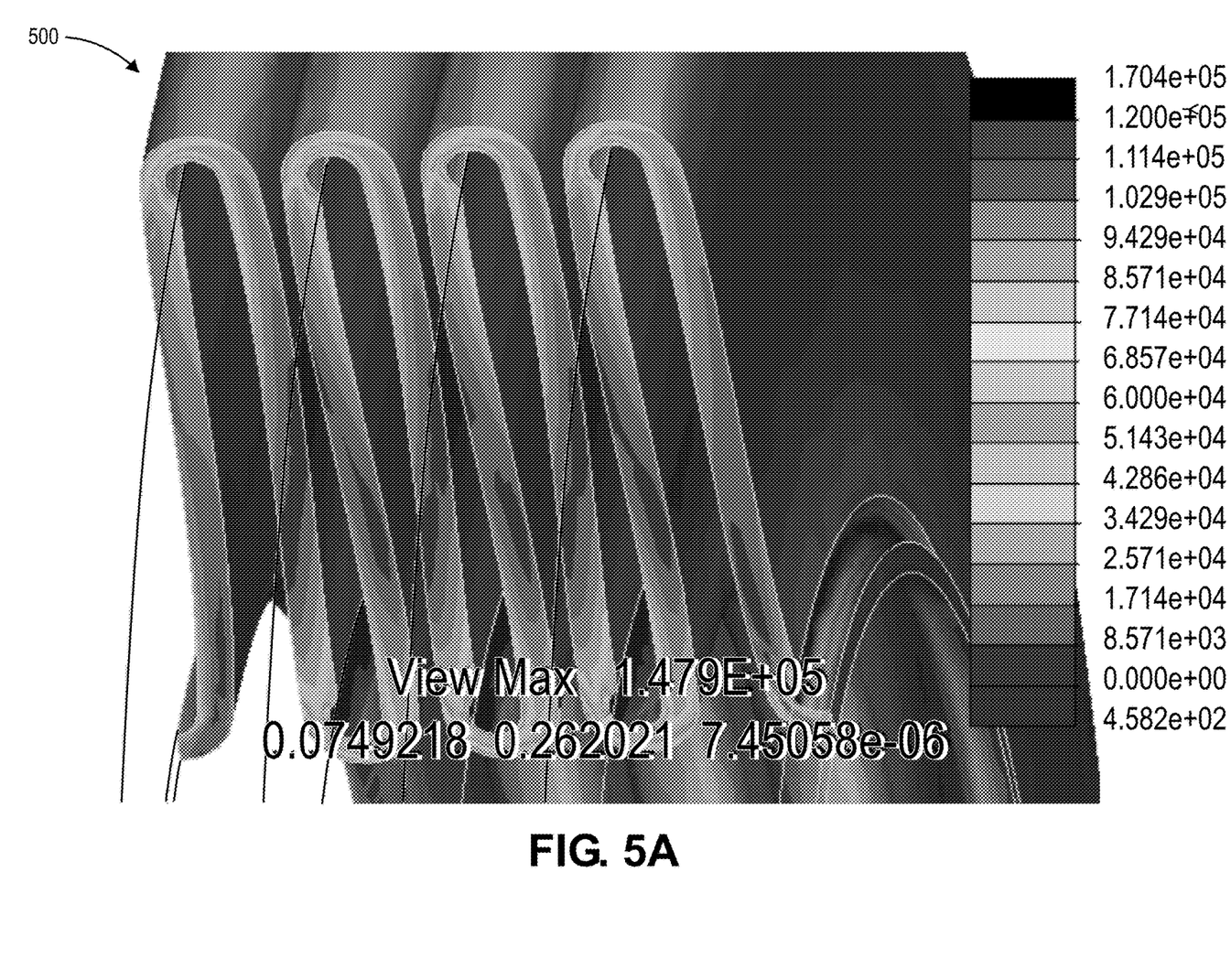
FIG. 5A illustrates a cross-sectional perspective view of a portion of a second design of another bellows.
Figure 5B:
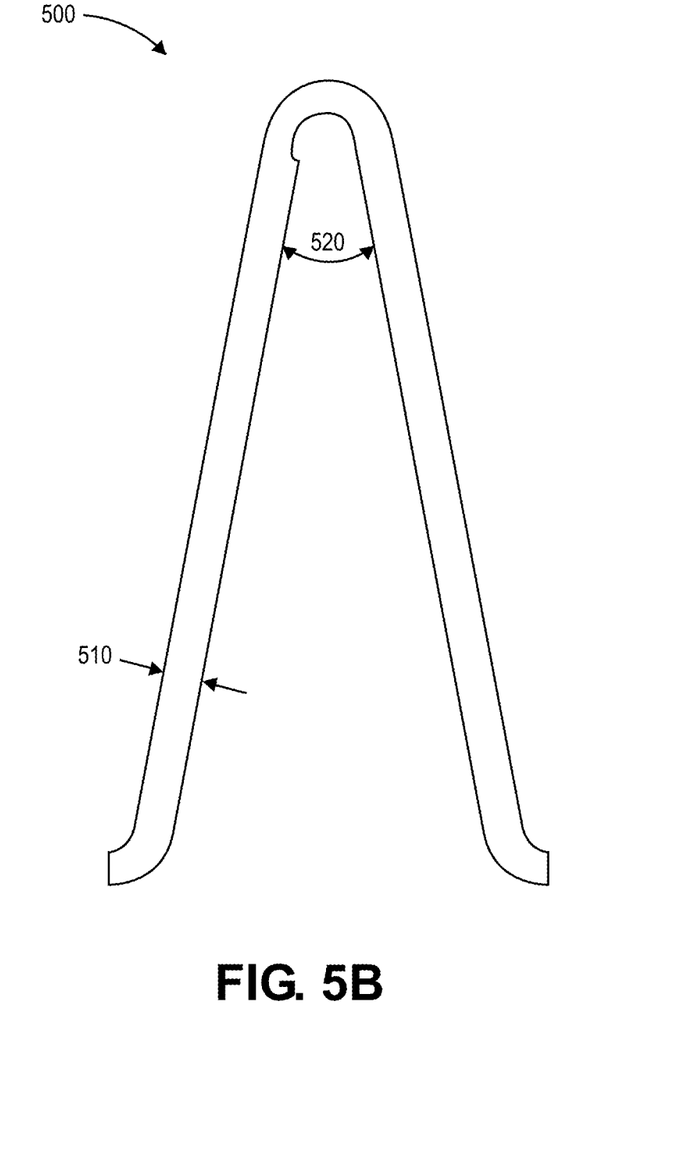
FIG. 5B is a cross-sectional side view of one period of the bellows in FIG. 5A, according to an embodiment.
Figure 6A:
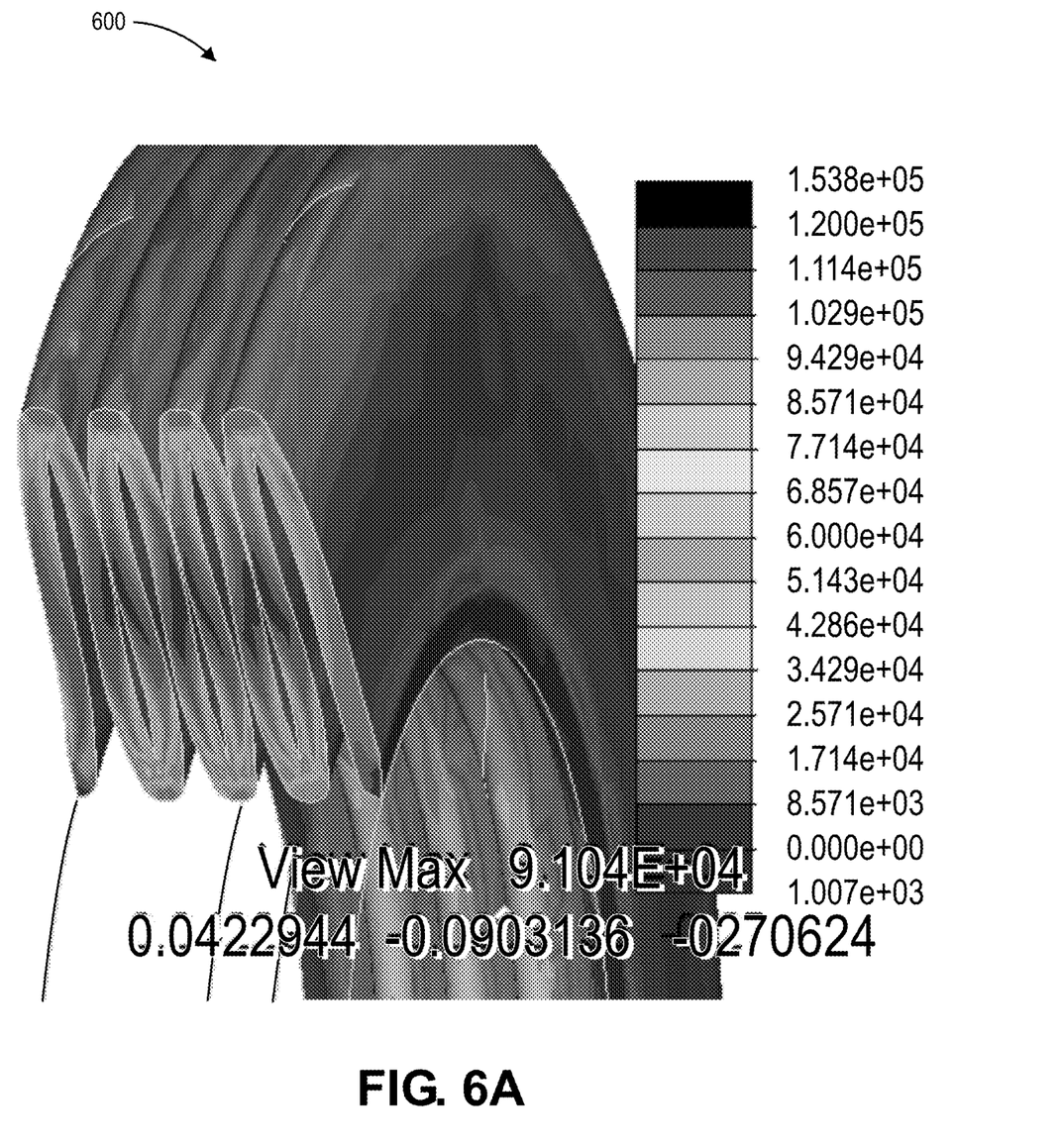
FIG. 6A illustrates a cross-sectional perspective view of a portion of a third design of another bellows.
Figure 6B:
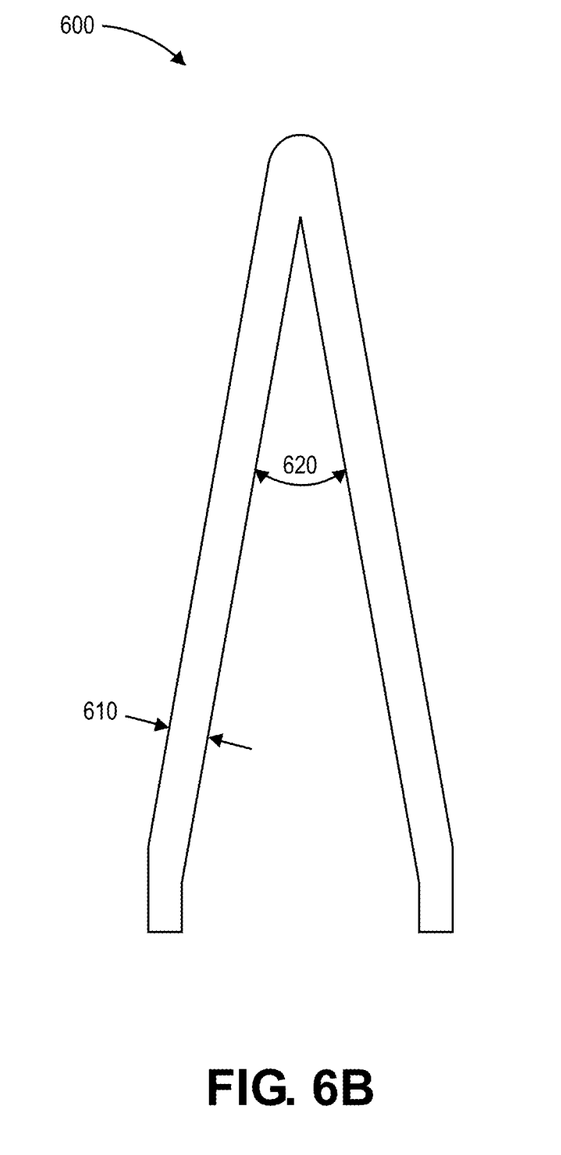
FIG. 6B is a cross-sectional side view of one period of the bellows in FIG. 6A, according to an embodiment.
Figure 7A:
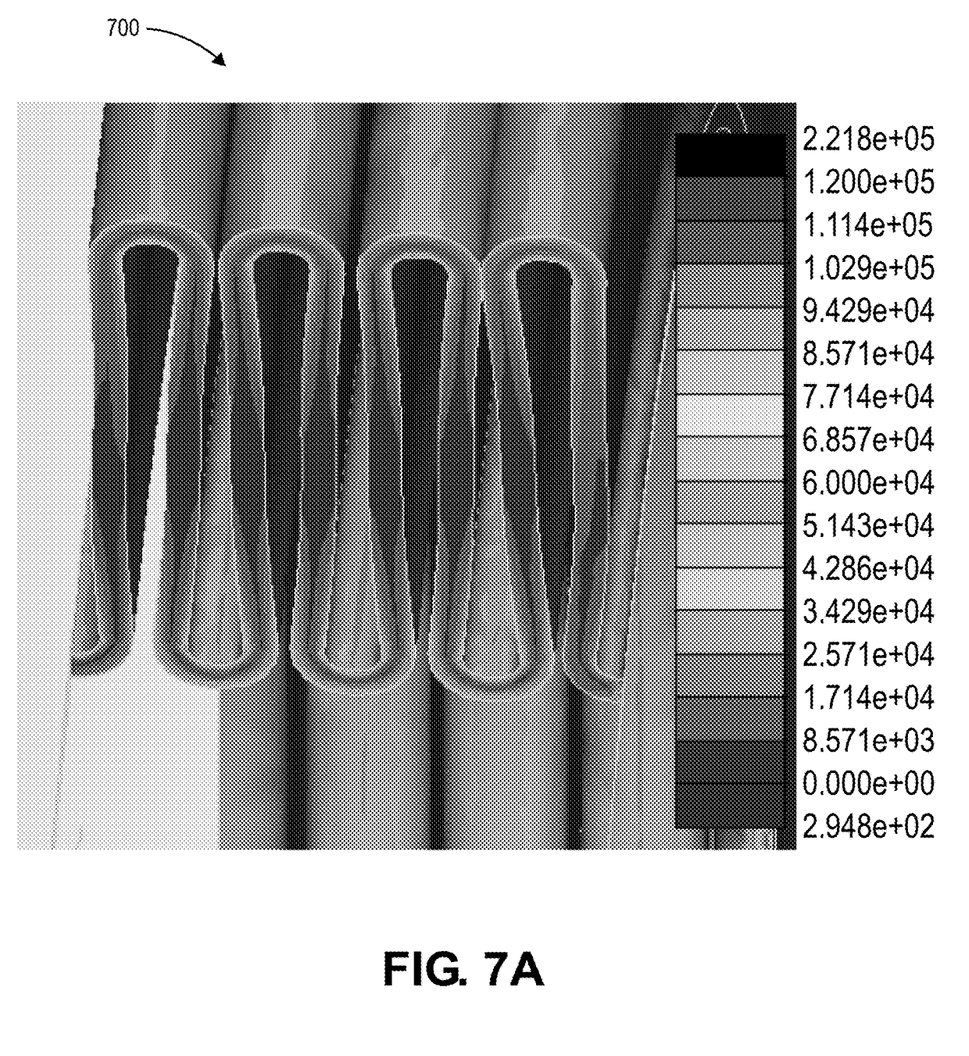
FIG. 7A illustrates a cross-sectional perspective view of a portion of a fourth design of another bellows.
Figure 7B:
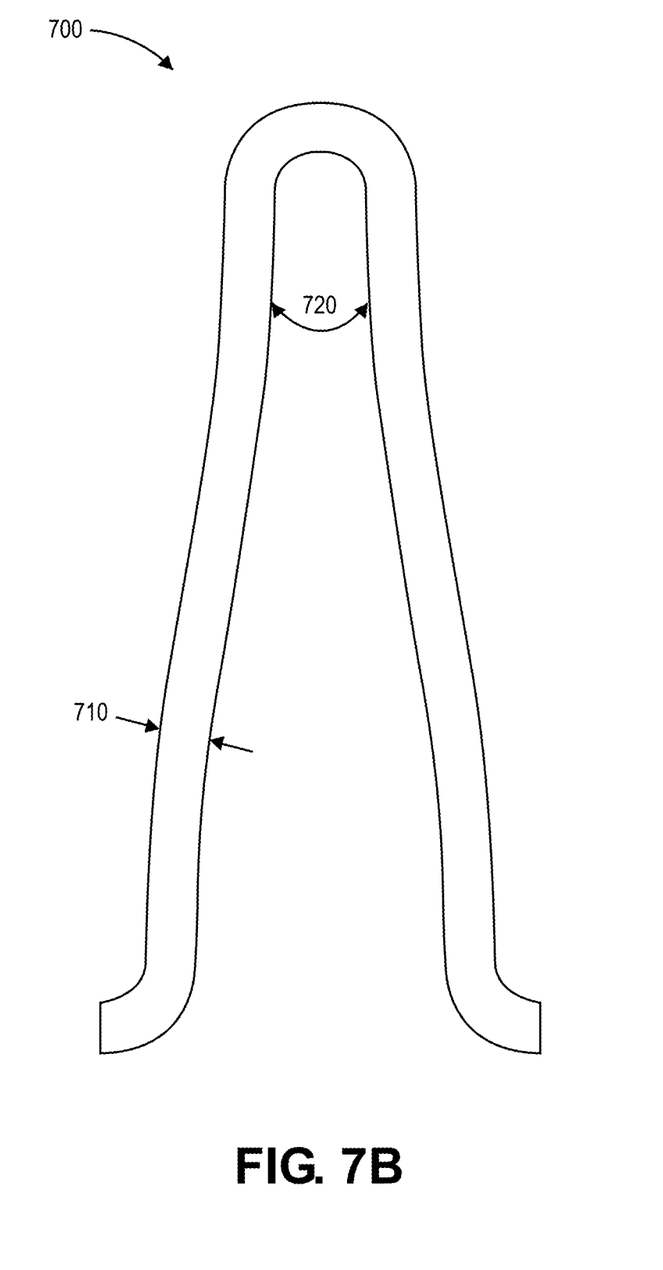
FIG. 7B is a cross-sectional side view of one period of the bellows in FIG. 7A, according to an embodiment.

FIG. 4A illustrates a cross-sectional perspective view of a portion of a first design of another bellows 400, and FIG. 4B is a cross-sectional side view of one period of the bellows 400, according to an embodiment. FIG. 5A illustrates a cross-sectional perspective view of a portion of a second design of another bellows 500, and FIG. 5B is a cross-sectional side view of one period of the bellows 500, according to an embodiment. FIG. 6A illustrates a cross-sectional perspective view of a portion of a third design of another bellows 600, and FIG. 6B is a cross-sectional side view of one period of the bellows 600, according to an embodiment. FIG. 7A illustrates a cross-sectional perspective view of a portion of a fourth design of another bellows 700, and FIG. 7B is a cross-sectional side view of one period of the bellows 700, according to an embodiment.

The bellows 400-700 have different shapes, sizes, thicknesses, material compositions, or a combination thereof. Table 1 below describes the different results achieved by the different shapes, sizes, thicknesses, material compositions, or a combination thereof, according to a few specific embodiments.

TABLE 1

| Reference # | length analyzed | deflection (in) | % of length | load (lbf) | spring rate (lbs) | max von mises |
|---|---|---|---|---|---|---|
| 400 | 0.791116 | 0.452 | 57.13% | 140 | 176.9652 | 140k |
| 500 | 0.5445358 | 0.329 | 60.42% | 50 | 91.821327 | 147.9k |
| 600 | 0.3812 | 0.2373 | 62.25% | 75 | 196.74711 | 91k |
| 700 | 0.461956 | 0.251 | 54.33% | 44 | 95.247166 | 85k |

As used herein, the "length analyzed" refers to the uncompressed length of the bellows 400-700 that is analyzed. The "deflection" refers to the compressed length. The % of length refers to the compressed length divided by the uncompressed length. The load refers to the force that compresses the bellows 400-700. The spring rate refers to the amount of weight/force that causes the bellows 400-700 to be compressed to the compressed length (i.e., the deflection length). The max von mises refers to the maximum von mises stress.

The bellows 400, 600 were developed by modifying the thickness and/or material composition to adhere to the additive manufacturing (AM) processes limitations. The bellows 500 explores one or more advantages of AM technology and reduces the spring rate. The spring rate may depend at least partially upon the thickness 410-710 of the bellows 400-700 and/or the angle 420-720 between two adjacent intermediate portions. The angle(s) 420-720 may be from about 2° to about 25° or about 7° to about 12°. However, the bellows 500 has the highest concentrated stress value. The bellows 700 has a lower maximum von mises stress, which may result in a higher cycle count (e.g., depending upon the surface finish).

Figure 8:
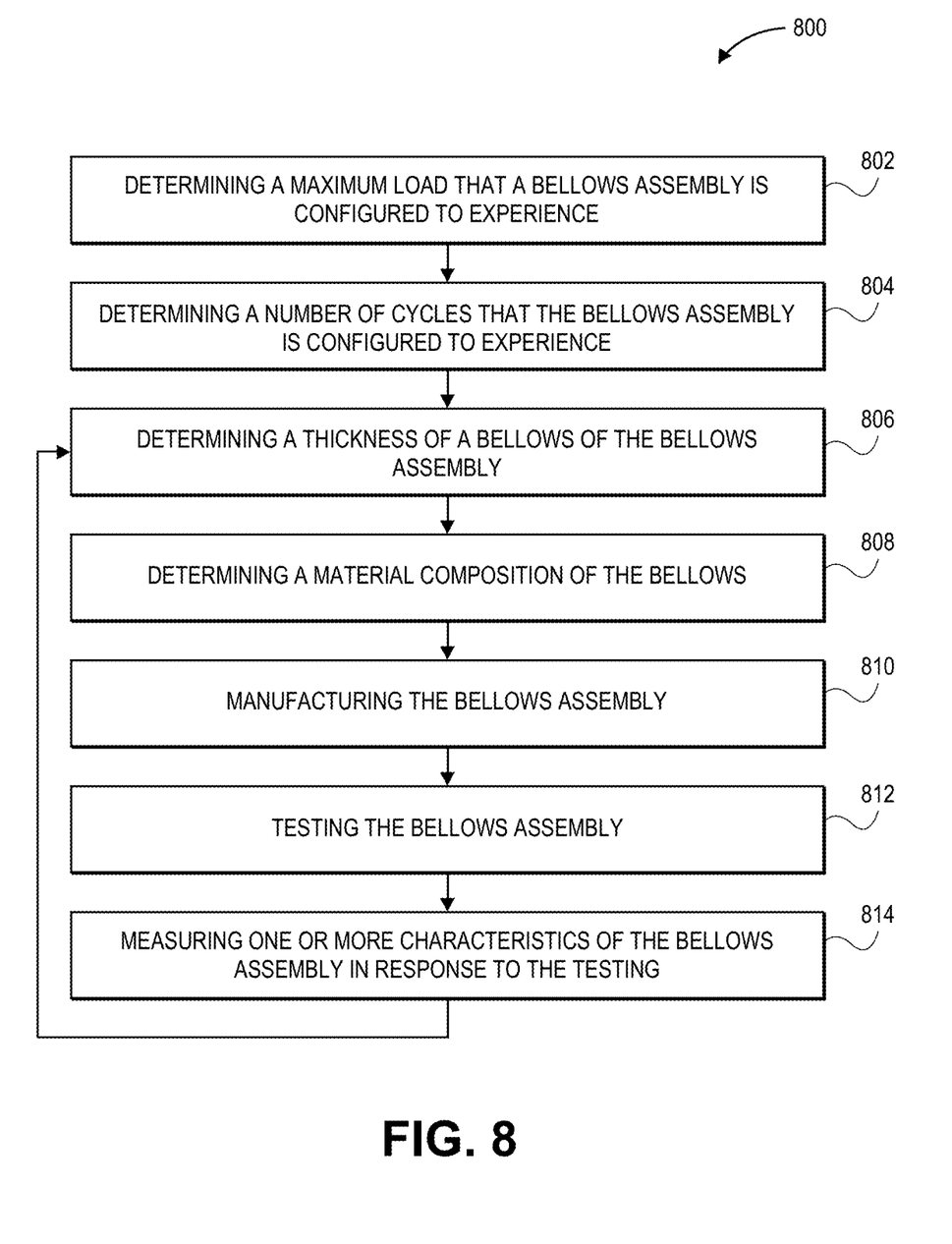
FIG. 8 illustrates a flowchart of a method for manufacturing the bellows assembly, according to an embodiment.

FIG. 8 illustrates a flowchart of a method 800 for manufacturing the bellows assembly 110, according to an embodiment. An illustrative order of the method 800 is provided below; however, one or more portions of the method 800 may be performed in a different order, performed simultaneously, repeated, or omitted.

The method 800 may include determining a maximum load that the bellows assembly 200 may experience (e.g., in a downhole environment), as at 802. The method 800 may also include determining a number of cycles that the bellows assembly 200 may experience (e.g., in the downhole environment), as at 804. As used herein, a "cycle" refers to one period of expansion and retraction.

The method 800 may also include determining the thickness 216 of the bellows 110, as at 806. The thickness 216 may be determined based at least partially upon the maximum load, the number of cycles, or both. In one embodiment, determining the thickness 216 may include determining the thickness 216 at one or more locations over the length 218 of the bellows 110 such that the thickness 216 varies over the length 218. The thickness 216 may be determined by running an algorithm on a computing system (e.g., computing system 900 discussed below).

The method 800 may also include determining a material composition of the bellows 110, as at 808. The material composition may be determined based at least partially upon the maximum load, the number of cycles, the thickness 216, or a combination thereof. In one embodiment, determining the material composition may include determining the material composition at one or more locations over the length 218 of the bellows 110 such that the material composition varies over the length 218. The material composition may be determined by running an algorithm on the computing system 900.

The method 800 may also include manufacturing the bellows assembly 110, as at 810. The bellows assembly 110 may be manufactured based at least partially upon the maximum load (from 802), the number of cycles (from 804), the thickness 216 (from 806), the material composition (from 808), or a combination thereof. As discussed above, the bellows assembly 110 may be manufactured via an additive manufacturing process such that the bellows 120 and the seal rings 130, 140 are a single, monolithic component.

The method 800 may also include testing the bellows assembly 110, as at 812. The bellows assembly 110 may be tested by applying a test force to the bellows assembly 110 for one or more cycles. The test force may remain constant during the cycles, or the force may vary. The test force may be the maximum force (from 802), or the test force may be less than the maximum force.

The method 800 may also include measuring one or more characteristics of the bellows assembly 110 in response to the testing, as at 814. The characteristics may be measured before the testing, during the testing, after the testing, or a combination thereof. The characteristics may be or include the deflection, the spring rate, the maximum von mises stress, or a combination thereof.

The method 800 may then loop back around to step 806, 808, or 810. For example, the thickness 216 may be modified (e.g., during another iteration of 806) and/or the material composition may be modified (e.g., during another iteration of 808), based at least partially upon the maximum load, the number of cycles, the one or more characteristics, or a combination thereof. Another bellows assembly 110 may then be manufactured (e.g., during another iteration of 810) based at least partially upon the modified thickness 216 and/or material composition.

Figure 9:
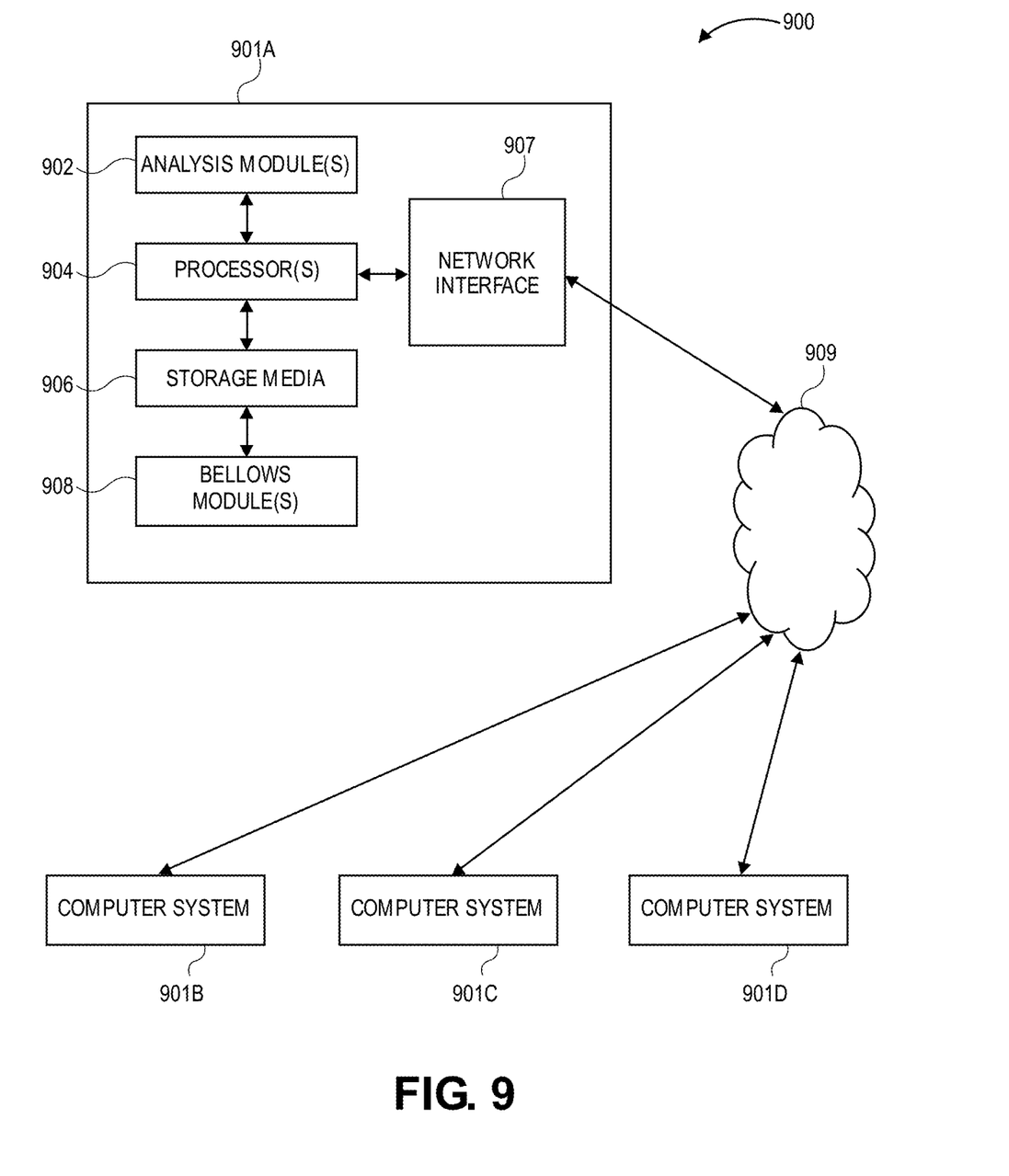
FIG. 9 illustrates an example of a computing system for designing and/or analyzing one or more of the bellows, in accordance with some embodiments.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 900 contains one or more bellows module(s) 908 configured to design and/or analyze the bellows 110, 500-800. It should be appreciated that computing system 900 is merely one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A bellows assembly for a downhole tool, the bellows assembly comprising:
    a first seal ring;
    a second seal ring; and
    a bellows positioned at least partially between the first and second seal rings, wherein the first seal ring, the second seal ring, and the bellows are integral with one another such that the bellows assembly is monolithic, wherein the bellows is configured to expand and retract, wherein the bellows is annular and has a diameter that varies over a length of the bellows, and wherein the bellows is shaped as a wave form along the length, the wave form including:
        an inner curved portion;
        an outer curved portion; and
        an intermediate portion coupling the inner and outer curved portions;
        the inner and outer curved portions are made from a shape-memory alloy; and
        the intermediate portion is made from a non-shape-memory alloy.

2. The bellows assembly of claim 1, wherein the first seal ring is annular and comprises an inner surface with a first recess defined therein, wherein the inner surface of the first seal ring is configured to contact an outer surface of a first tubular member, and further comprising a first sealing member positioned at least partially within the first recess, wherein the first sealing member is configured to provide a fluid-tight seal between the inner surface of the first seal ring and the outer surface of the first tubular member.

3. The bellows assembly of claim 2, wherein the second seal ring is annular and comprises an outer surface with a second recess defined therein, wherein the outer surface of the second seal ring is configured to contact an inner surface of a second tubular member, and further comprising a second sealing member positioned at least partially within the second recess, wherein the second sealing member is configured to provide a fluid-tight seal between the outer surface of the second seal ring and the inner surface of the second tubular member.

4. The bellows assembly of claim 1, wherein the bellows is not welded to the first and second seal rings.

5. The bellows assembly of claim 1, wherein a material composition of the intermediate portion comprises cobalt, nickel, iron, chromium, titanium, an alloy doped with one or more of chromium, vanadium, copper, hafnium, palladium, platinum, zirconium, or cobalt, or a combination thereof.

6. The bellows assembly of claim 1, wherein the bellows comprises an inner surface and an outer surface, and wherein a thickness between the inner and outer surfaces varies over the length of the bellows.

7. The bellows assembly of claim 6, wherein the bellows comprises a sinewave shape and an intermediate portion, and wherein a thickness of the inner and outer curved portions is different than a thickness of the intermediate portion.

8. The bellows assembly of claim 7, wherein the thickness of the inner and outer curved portions is greater than the thickness of the intermediate portion.

9. The bellows assembly of claim 1, wherein a stiffness of the bellows is variable and non-linear over the length of the bellows.

10. A method for manufacturing a bellows assembly, the method comprising:
    determining a load that the bellows assembly is configured to experience;
    determining a number of cycles that the bellows assembly is configured to experience;
    determining a thickness of a bellows of the bellows assembly based at least partially upon the load and the number of cycles;
    determining a material composition of the bellows based at least partially upon the load and the number of cycles, wherein the material composition varies over a length of the bellows; and
    manufacturing the bellows assembly via an additive manufacturing process, wherein the bellows assembly is manufactured based at least partially upon the thickness and the material composition, wherein the bellows assembly comprises:
    a first seal ring;
    a second seal ring; and
    a bellows positioned at least partially between the first and second seal rings, wherein the first seal ring, the second seal ring, and the bellows are integral with one another such that the bellows assembly is monolithic, wherein the bellows is configured to expand and retract, wherein the bellows is annular and has a diameter that varies over a length of the bellows, and wherein the bellows is shaped as a wave form along the length, the wave form including:
    an inner curved portion;
    an outer curved portion; and
    an intermediate portion coupling the inner and outer curved portions;
    the inner and outer curved portions are made from a shape-memory alloy; and
    the intermediate portion is made from a non-shape-memory alloy.

11. The method of claim 10, wherein the thickness varies over the length of the bellows.

12. The method of claim 11, wherein a thickness of the inner and outer curved portions is different than a thickness of the intermediate portion.

13. The method of claim 12, wherein the thickness of the inner and outer curved portions is greater than the thickness of the intermediate portion.

14. The method of claim 10, wherein the bellows is not welded to the first and second seal rings.

15. The method of claim 10, wherein a material composition of the intermediate portion comprises cobalt, nickel, iron, chromium, titanium, an alloy doped with one or more of chromium, vanadium, copper, hafnium, palladium, platinum, zirconium, or cobalt, or a combination thereof.

16. The method of claim 10, further comprising testing the bellows assembly after the bellows assembly is manufactured, wherein testing the bellows assembly comprises applying a test force to the bellows assembly for a number of test cycles.

17. The method of claim 16, further comprising measuring one or more characteristics of the bellows assembly in response to the testing, wherein the one or more characteristics comprise a deflection of the bellows assembly, a spring rate of the bellows assembly, a maximum von mises stress on the bellows assembly, or a combination thereof.

18. The method of claim 17, further comprising:
    modifying the thickness, a material composition of the bellows, or both based at least partially upon the one or more characteristics; and
    manufacturing another bellows assembly based at least partially upon the modified thickness, the modified material composition, or both.

* * * * *